United States Patent [19]
Matsubara et al.

[11] Patent Number: 5,930,021
[45] Date of Patent: Jul. 27, 1999

[54] OPTICAL SHUTTER ELEMENT DRIVE MECHANISM

[75] Inventors: Ken Matsubara, Takatsuki; Yuji Kamoda, Ibaraki; Tomohiko Masuda, Takatsuki, all of Japan

[73] Assignee: Minolta Co., Ltd., Osaka, Japan

[21] Appl. No.: 09/031,038

[22] Filed: Feb. 26, 1998

[30] Foreign Application Priority Data

Feb. 27, 1997 [JP] Japan .................................... 9-043607

[51] Int. Cl.⁶ .............................. G02F 1/03; G02F 1/29; G02F 1/13
[52] U.S. Cl. .......................... 359/245; 359/246; 359/320; 349/3; 349/33; 347/136
[58] Field of Search ............................ 347/136; 359/245, 359/246, 315, 320; 349/3, 41, 33

[56] References Cited

U.S. PATENT DOCUMENTS 4,189,734  2/1980  Kyser et al. .............................. 346/1.1
5,155,618  10/1992  Matsubara et al. ..................... 359/245

FOREIGN PATENT DOCUMENTS 63-189826  8/1988  Japan .
7-140943  6/1995  Japan .

*Primary Examiner*—Georgia Epps
*Assistant Examiner*—Margaret Burke
*Attorney, Agent, or Firm*—McDermott, Will & Emery

[57] ABSTRACT

An optical shutter element drive mechanism for driving optical shutter elements that are electrically equivalent to condensers by charging and discharging the elements by a power source and switching elements. The optical shutter element drive mechanism includes a resistor through which a current for charging the optical shutter elements flows when the optical shutter elements are charged and through which a current for discharging the optical shutter elements flows when the optical shutter elements are discharged.

19 Claims, 5 Drawing Sheets

OPTICAL SHUTTER ELEMENT DRIVE MECHANISM

This application is based on application number 09-043607 filed in Japan on Feb. 27, 1997, the content of which is hereby incorporated by reference.

FIELD OF THE INVENTION

The present invention relates to an optical shutter element drive mechanism that drives optical shutter elements, and more particularly to an optical shutter element drive mechanism that drives optical shutter elements that from an electrical standpoint are equivalent to condensers. The optical shutter elements are charged and discharged by means of a power source and switching elements.

BACKGROUND OF THE INVENTION

Image forming apparatuses such as copying machines or printers that use an optical shutter array are known. Such known optical shutter arrays comprise optical shutter elements that are micro-pixel units having an electrooptical Kerr effect, and are used as a printer head that exposes a photoreceptor. Typically, the optical shutter element comprises PLZT, or some other material having a large Kerr constant. In operation, the optical shutter elements either shield the light from the light source or allow the light to pass so as to form an image on the surface of the photoreceptor. An image is then formed on the recording sheet based on the image formed on the photoreceptor. Notwithstanding the widespread use of optical shutter arrays, as explained below known arrays suffer various problems resulting from heat/power dissipation.

For example, in a typical optical shutter array having a recording density of approximately 400 dpi, the capacitance of each element (optical shutter element) of the optical shutter array is approximately 20 pF. Thus, if the drive voltage for the optical shutter array is 50 V and the drive frequency is 2 kHz, the power consumption for an element when one element is driven is 0.1 mW pursuant to formula (G) set forth below.

Continuing this example, if the drive frequency for a 400 dpi image forming apparatus is set at 2 kHz, the recording speed of the image recording device will be approximately 10 cm/sec. For this image forming apparatus to handle high-speed printing at speeds of up to 100 cm/sec, the drive frequency must be raised to 20 kHz. When the drive frequency is 20 kHz, however, the power consumption per element is 1 mW.

Further, when the recording density is 400 dpi, 4,725 elements are needed to form an A3-size print head. If such a print head is driven with a 20 kHz drive frequency, when all of the elements are operating, the power consumed by the entire optical shutter array is 1 mW×4,725 =4.725W. This power is consumed mainly by the drive ICs that perform switch driving regarding the charging and discharging of the optical shutter array, and is released as Joule heat. The drive ICs are ordinarily mounted near the optical shutter array. However, the optical shutter elements of the optical shutter array are affected by the heat released in the foregoing manner due to their temperature characteristic.

FIG. 8 is a drawing showing the temperature characteristic with regard to the optimal drive voltage for the optical shutter array. Herein, the optimal drive voltage means the drive voltage that maximizes the amount of light that passes through the optical shutter array.

Referring to FIG. 8, it is shown that when the temperature of the optical shutter array increases, the optimal drive voltage increases. If the drive voltage for the optical shutter array is increased in order to reach the optimal drive voltage level, the power consumed by the drive ICs increases, based on formula (G) explained below, and the temperature of the optical shutter array increases further. When the temperature of the optical shutter array increases, the optimal drive voltage also increases. The drive voltage for the optical shutter array must then be increased further to reach the optimal drive voltage level, thereby creating a vicious cycle.

In addition, regardless of this vicious cycle, the heat generated by the drive ICs may damage the ICs. While it is possible to reduce the increase in the temperature of the drive ICs by cooling them via air cooling, etc., since the drive ICs are ordinarily sealed inside the print head and are located in a linear fashion along the optical shutter array, it is difficult to effectively cool the optical shutter array.

Accordingly, the object of the present invention is to resolve the foregoing problems. More specifically, it is an object of the present invention to provide an optical shutter element drive mechanism that can prevent the temperature increase of the switching elements used for the driving the optical shutter elements in a simple, cost efficient manner.

SUMMARY OF THE INVENTION

The present invention relates to an optical shutter element drive mechanism that drives the optical shutter elements that are electrically equivalent to condensers by charging and discharging the elements by means of a power source and switching elements. The optical shutter element drive mechanism of the present invention includes a resistor through which a current that charges the optical shutter elements flows when the optical shutter elements are charged and through which a current that discharges the optical shutter elements flows when the optical shutter elements are discharged.

In accordance with the present invention, a current that charges or discharges the optical shutter elements flows to the resistor during charging or discharging of the optical shutter elements, and therefore power is consumed by the resistor. As a result, the power consumed by the switching elements that are utilized to drive the optical shutter elements is reduced and the undesirable increase in the temperature of the switching elements is prevented.

As described in detail below, the device of the present invention provides important advantages over the prior art. Most importantly, the present invention reduces the power dissipated by the switching elements of the optical shutter array, thereby preventing a temperature increase of the switching elements as a result of operating the switching elements.

In addition, the present invention prevents the temperature increase of the switching elements via a simple circuit, which is both cost effective and easy to implement.

Additional advantages of the present invention will become apparent to those skilled in the art from the following detailed description of exemplary embodiments, which exemplify the best mode of carrying out the invention.

The invention itself, together with further objects and advantages, can be better understood by reference to the following detailed description and the accompanying drawings.

DETAILED DESCRIPTION

An optical shutter element drive mechanism in accordance with the present invention is described below. In the following description, numerous specific details are set forth in order to provide a thorough understanding of the present invention. It will be obvious, however, to one skilled in the art that these specific details need not be employed exactly as set forth herein to practice the present invention.

Figure 1:
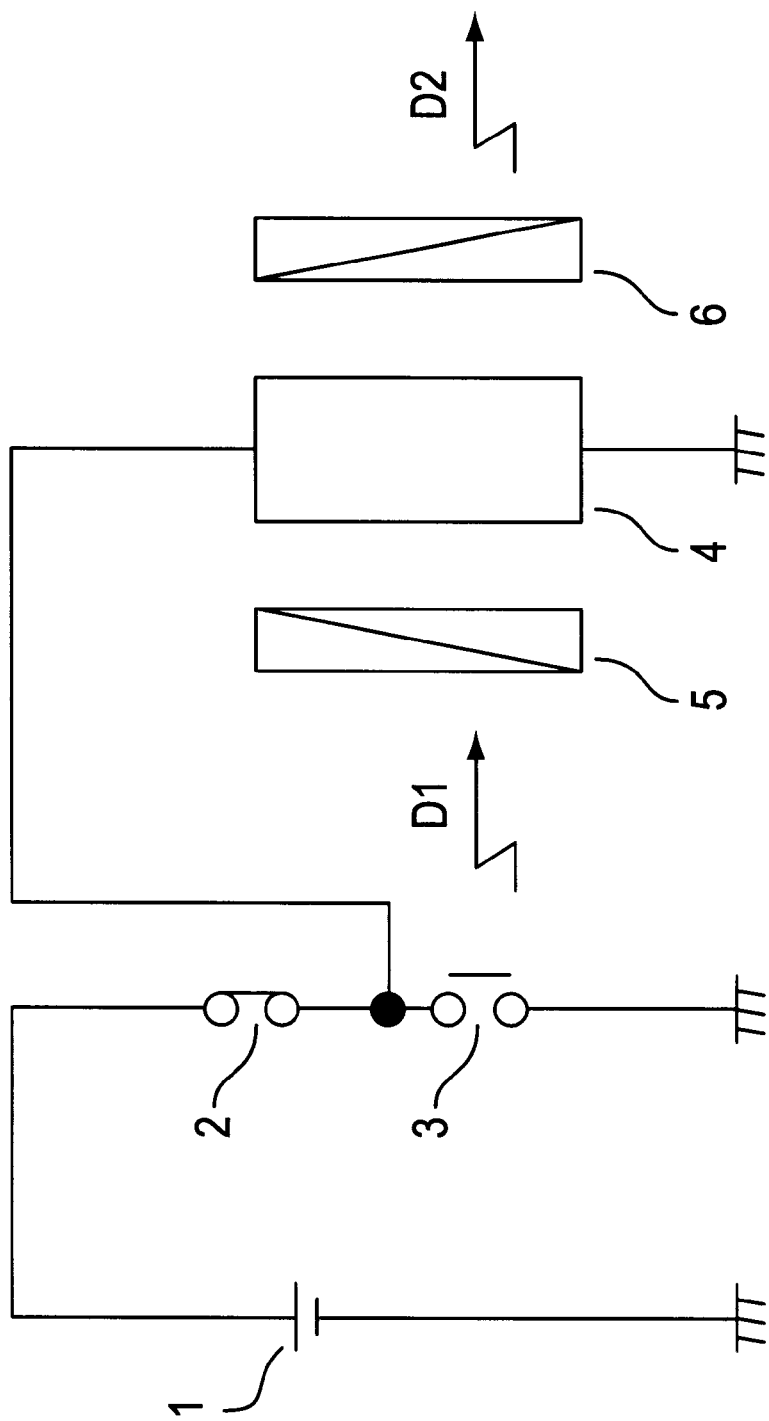
FIG. 1 is a drawing illustrating the operation of driving a PLZT as an optical shutter.

FIG. 1 is a drawing illustrating the operation of driving a PLZT as an optical shutter. The circuit for driving a PLZT optical shutter 4 includes drive power source 1, charge switch 2 and discharge switch 3. Referring to FIG. 1, reference numbers 5 and 6 indicate a polarizer and analyzer. Polarizer 5 and analyzer 6 are mounted in a cross nicoled arrangement.

In operation, the incident light that enters in the direction of arrow D1 from the light source (not shown in the drawing) has random planes of polarization. Of this incident light, polarizer 5 selectively allows only a light component having a certain direction of polarization to pass through. The light that passes through polarizer 5 reaches optical shutter 4.

PLZT optical shutter 4 comprises multiple PLZT optical shutter elements that comprise aligned micro-pixel units, and each PLZT optical shutter element has an electrooptical Kerr effect. The PLZT optical shutter elements are charged by drive power source 1 when charge switch 2 is closed and discharge switch 3 is open. When charged, the PLZT optical shutter elements rotate the plane of polarization of the incident light. The PLZT optical shutter elements are discharged by drive power source 1 when charge switch 2 is open and discharge switch 3 is closed. When discharged, the PLZT optical shutter elements do not change the plane of polarization of the incident light.

In other words, the incident light that has a certain direction of polarization due to polarizer 5 rotates the plane of polarization only when the PLZT optical shutter 4 is charged. Due to this rotation of the plane of polarization, the light that has passed through PLZT optical shutter 4 passes analyzer 6 that is situated at a 90° relative to polarizer 5 and exits in the direction of arrow D2.

When this happens, the relationship set forth in equation (A) below exists between the incident light that enters in the direction of arrow D1 and the exiting light that exits in the direction of arrow D2. Referring to equation (A), Io represents the amount of exiting light and Ii the amount of incident light. Further, n represents the refractive index of the PLZT, L represents the length of the light path, R represents the Kerr constant, E represents the electric field strength and λ represents the wavelength of the light.

$$Ii/Io = \sin(-\pi \cdot n^2 \cdot R \cdot L \cdot E^2/(2 \cdot \lambda)) \quad (A)$$

Figure 2:
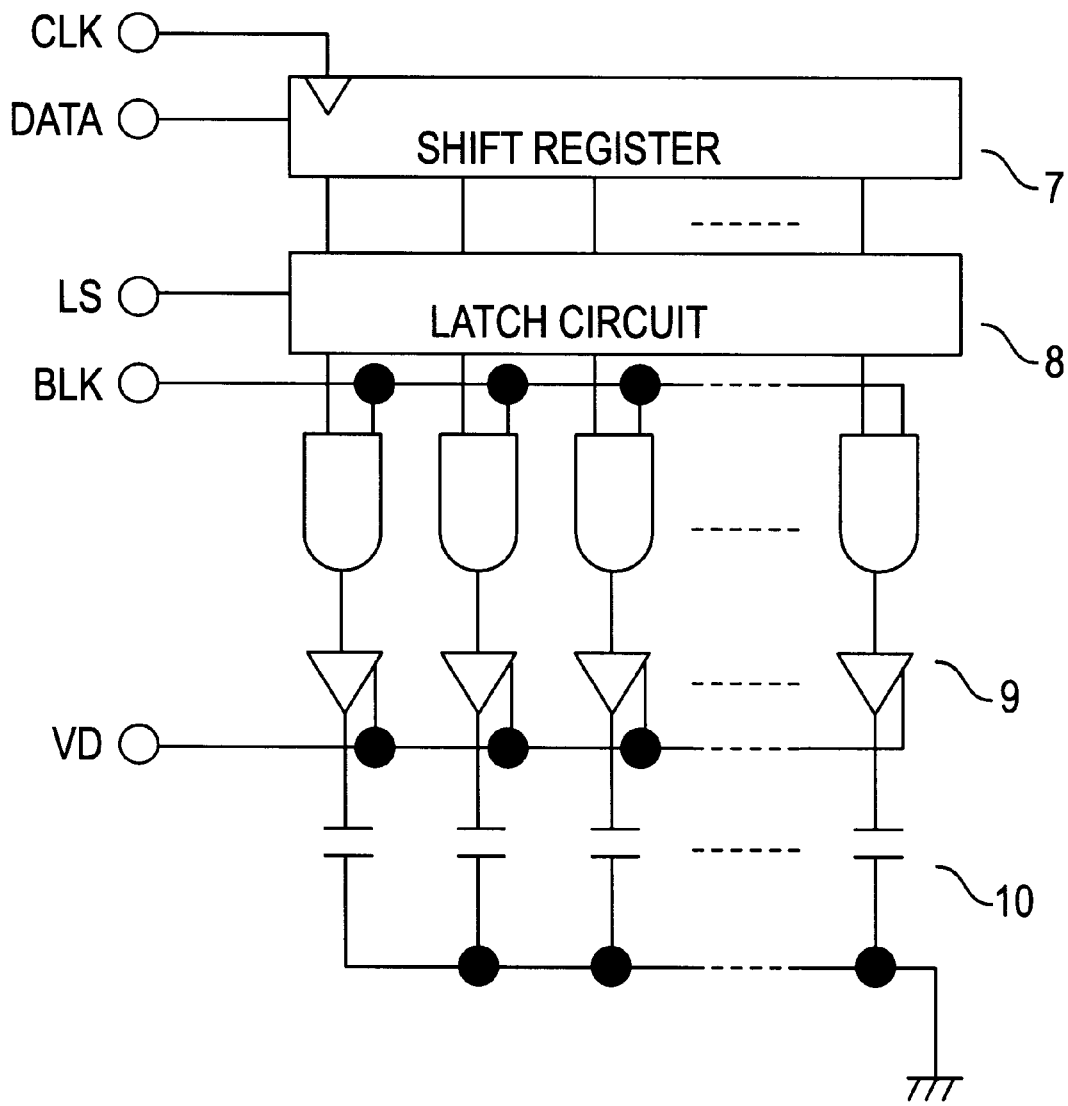
FIG. 2 is a drawing illustrating the operation of the drive circuit when the PLZT optical shutter operates as an optical recording device such as a printer.

FIG. 2 is a drawing illustrating the operation of the drive circuit when the PLZT optical shutter operates as an optical recording device for a printer, etc. Image data DATA is transferred to shift register 7 in synchronization with clock signal CLK. This DATA is latched by DATA latch circuit 8 upon receipt of the latch strobe signal LS. Blank signal BLK is turned ON and OFF, and a high-voltage pulse is applied to each optical shutter element 10 by means of high-voltage driver 9 in accordance with a signal in DATA latch circuit 8, such that the turning ON and OFF of each optical shutter element 10 is controlled.

Figure 3:
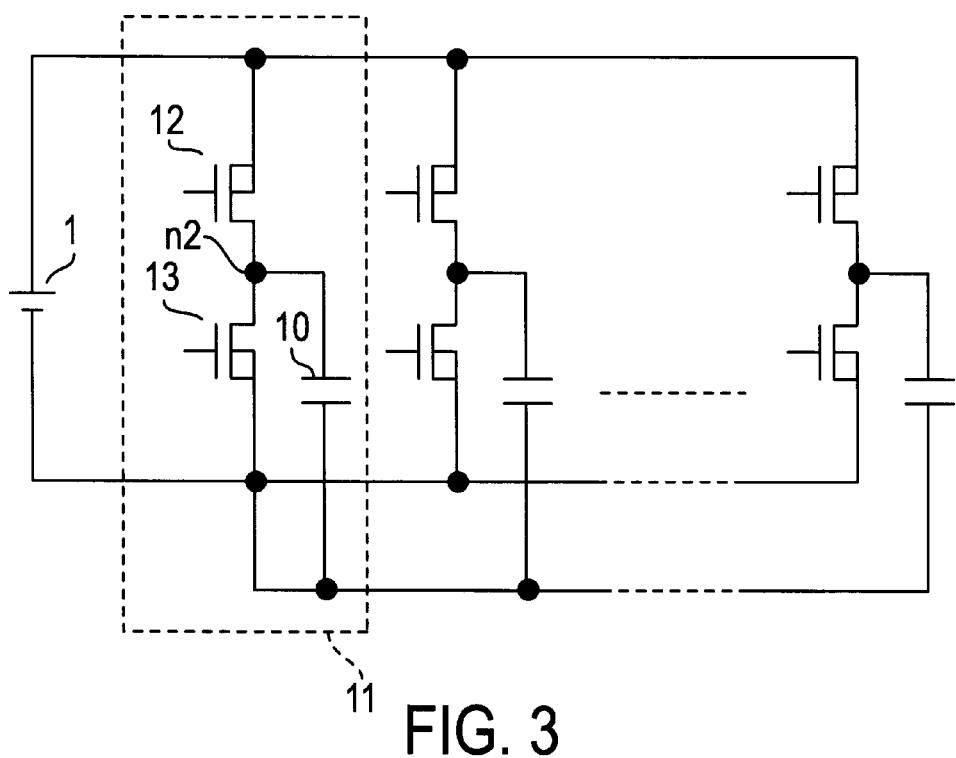
FIG. 3 is a drawing illustrating the circuit construction of the part of high-voltage driver 9 for driving the PLZT optical shutter.

FIG. 3 is a drawing illustrating the circuit construction of the part of high-voltage driver 9 for driving the PLZT optical shutter. Optical shutter elements that comprise the elements of the PLZT optical shutter are electrically equivalent to condensers. For optical shutter elements 10, the drive circuit comprises portion 11 that includes charge switching element 12 and discharge switching element 13, previously explained with reference to FIG. 1, arranged parallel to drive power source 1. In the circuit shown in FIG. 3, as in FIG. 1, a power supply voltage from drive power source 1 is applied to optical shutter elements 10 when the charge switching elements 12 are ON and the discharge switching elements 13 are OFF. The electric load accumulated in optical shutter elements 10 is discharged when charge the switching elements 12 are OFF and the discharge switching elements 13 are ON, whereupon the optical shutter turns OFF.

Figure 4A:
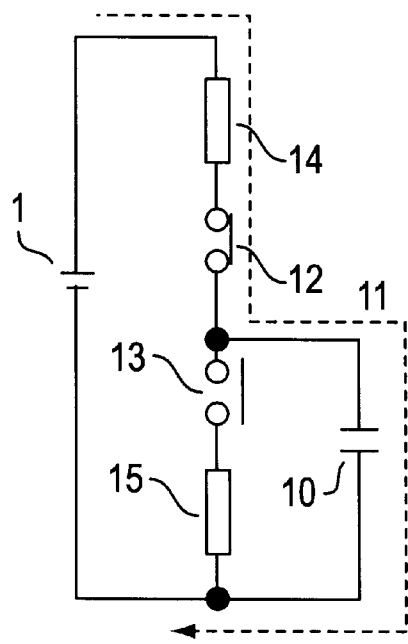
FIG. 4a and 4b are a drawings illustrating an equivalent circuit for each element of the circuit of FIG. 3 for driving the PLZT optical shutter.
Figure 4B:
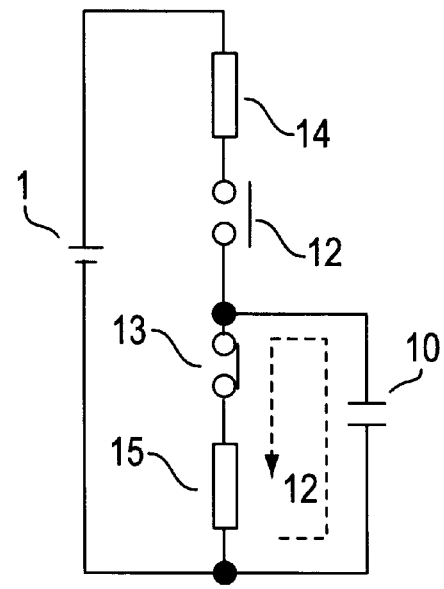

FIG. 4 is a drawing illustrating an equivalent circuit for each element of the circuit of FIG. 3 for driving the PLZT optical shutter. FIG. 4(a) is a drawing showing the flow of current in the equivalent circuit during the charging process, while FIG. 4(b) is a drawing showing the flow of current in the equivalent circuit during the discharging process.

Charge switching element 12 and discharge switching element 13 comprise resistor components 14 and 15, respectively. When the switching elements 12 and 13 are ON, the values of the resistor components are deemed R1 and R2. The capacitance of optical shutter element 10 is deemed C and the power supply voltage of drive power source 1 is deemed Vd. Using these values, the power that is consumed during the charging and discharging of the optical shutter is calculated in the following method.

(1) Power PR1 is consumed by resistor component 14 of charge switching element 12 during charging (FIG. 4(a)). A transient charging current i1 flows when the charge switching element 12 is ON and the discharge switching element 13 is OFF, as expressed in equation (B), during the charging period t. Power WR1 consumed by resistor component 14 through current i1 is expressed in equation (C), and the power consumed by resistor component 14 before C is completely charged is expressed in equation (D).

(2) Power PR2 is consumed by resistor component 15 of discharge switching element 13 during discharging (FIG. 4(b)). Power WR2 is consumed by resistor component 15 through transient discharging current i2 that flows when the charge switching element 12 is OFF and the discharge switching element 13 is ON, as expressed in equation (E) using the same calculation.

From (1) and (2) it follows that the power W that is consumed in one cycle of charging and discharging is expressed in equation (F). Where the optical shutter element 10 is driven at frequency f, consumed power Wf is expressed in equation (G).

Based on this equation (G), consumed power Wf consumed by the charge switching element 12 and the discharge switching element 13 in one cycle of charging and discharging is determined by the capacitance C of the optical shutter element 10, drive voltage Vd and drive frequency f. Importantly, the consumed power Wf is unrelated to the levels of resistance of the charge switching element 12 or the discharge switching element 13. However, it is assumed that when the optical shutter element 10 is driven at frequency f, charging and discharging of the optical shutter element 10 in one cycle are completely performed.

$$i1=(Vd/Ri)\times\exp(-t/(C\cdot R_1)) \quad (B)$$

$$PR1=R1\cdot i1^2=(Vd^2/R1)\times\exp(-2t/(C\cdot R1)) \quad (C)$$

$$WR1={}^8\int_o PR1dt=C\cdot Vd^2/2\times[\exp(2t/(C\cdot R)]_o =C\cdot Vd^2/2 \quad (D)$$

$$WR2=C\cdot Vd^2/2 \quad (E)$$

$$W=WR1+WR2=C\cdot Vd^2 \quad (F)$$

$$Wf=C\cdot Vd^2\cdot f \quad (G)$$

The principle of the optical shutter array drive circuit of the present invention will now be explained with reference to FIGS. 5 and 6.

Figure 5:
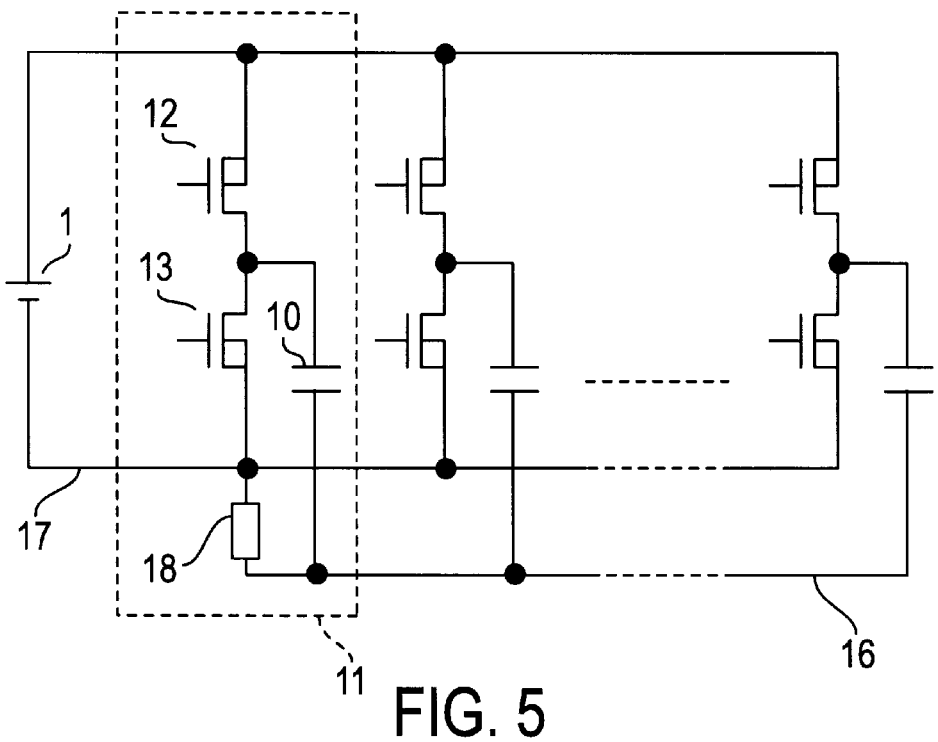
FIG. 5 is a drawing illustrating an exemplary embodiment of the circuit of the part of high-voltage driver 9 of the optical shutter array drive circuit of the present invention for driving the PLZT optical shutter.
Figure 6A:
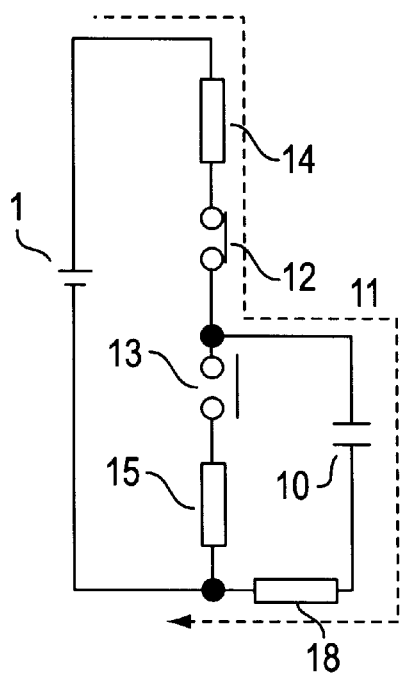
FIGS. 6(a) and 6(b) are drawings illustrating equivalent circuits for each element of the circuit for driving the PLZT optical shutter shown in FIG. 5.
Figure 6B:
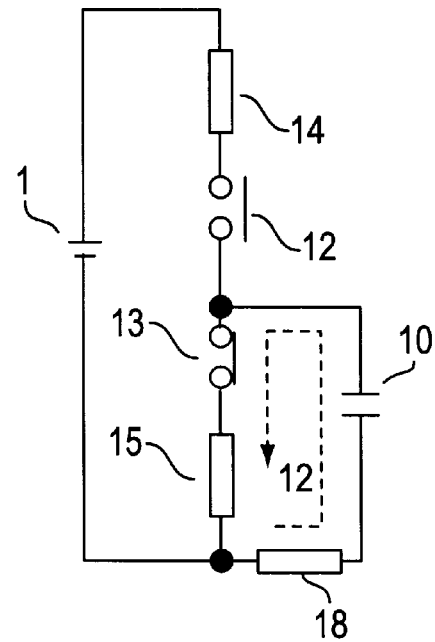

Specifically, FIG. 5 is a drawing illustrating an exemplary embodiment of the high-voltage driver 9 of the optical shutter array drive circuit of the present invention, which functions to drive the PLZT optical shutter. FIGS. 6(a) and 6(b) are drawings illustrating equivalent circuits for each element of the circuit for driving the PLZT optical shutter shown in FIG. 5. FIG. 6(a) shows an equivalent circuit during the charging process and FIG. 6(b) shows an equivalent circuit during the discharging process. FIGS. 5 and 6(a)–6(b) correspond to FIGS. 3 and 4, respectively, and the same numbers are used for the same parts.

In the optical shutter array drive circuit of the present invention, unlike the optical shutter array drive circuit shown in FIG. 3, heat distributing resistor 18 is mounted between (i) common electrode 16 which comprises one electrode of optical shutter element 10 and which is commonly connected to each optical shutter element and (ii) ground 17 of the power supply line of drive power source 1. The principle of the effect resulting from the connection of heat distributing resistor 18 is explained below.

Resistor 14 (when charge switching element 12 is ON) and resistor 15 (when discharge switching element 13 is ON) are deemed equal and they are both deemed to have a resistance level of R. The level of resistance of the heat distributing resistor 18 is deemed RL.

In the circuit shown in FIG. 5, power WRL that is consumed by heat distributing resistor 18 relative to the total power that is consumed by this system in one cycle of charging and discharging equals (consumed power during charging)+(consumed power during discharging), and is expressed in equation (H).

$$WRL=(RL/(RL+R))\times W/2+(RL/(RL+R))\times W/2=W\times(RL/(RL+R)) \quad (H)$$

From this equation (H), it is determined that the rate of power consumption by heat distributing resistor 18 increases by increasing RL relative to R, and therefore, the power consumed by charge switching element 12 and discharge switching element 13, i.e., the drive IC that include these elements, can be reduced.

An embodiment of the present invention utilizing the PLZT optical shutter drive circuit a print head is now explained.

Figure 7:
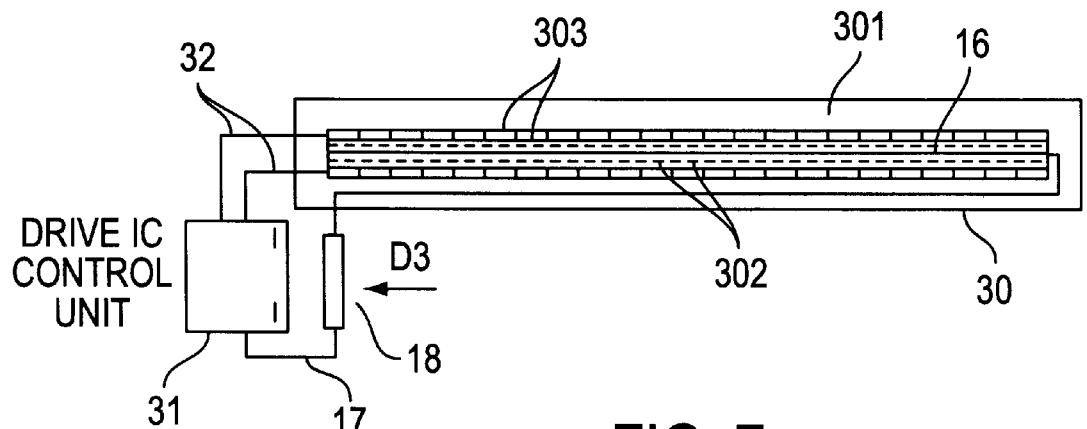
FIG. 7 is a drawing illustrating the PLZT optical shutter drive circuit of the present invention utilized in a print head.
Figure 8:
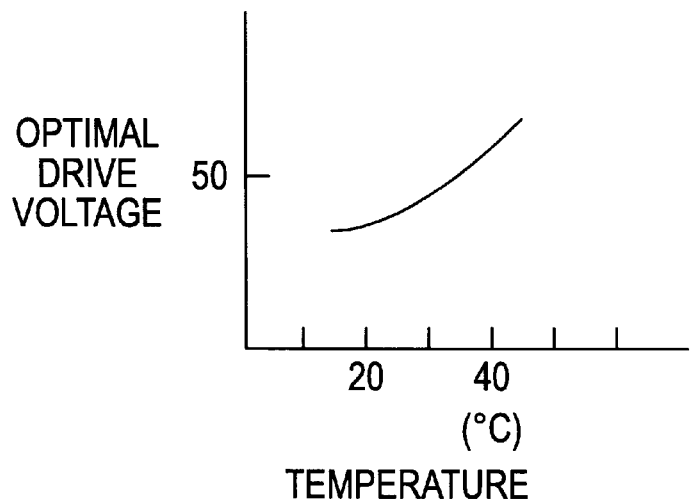
FIG. 8 is a drawing illustrating the temperature characteristic regarding the optimal drive voltage for the optical shutter array.

FIG. 7 is a drawing illustrating the PLZT optical shutter drive circuit of the present invention utilized in a print head. The PLZT optical shutter drive circuit comprises drive IC control unit 31 on an integrated circuit board to control drive ICs 303 in optical shutter array module 30 (including drive power source 1) and heat distributing resistor 18 that can concentrate the generation of heat. Optical shutter array module 30 includes optical shutter elements 302 that are aligned in a linear fashion and drive ICs 303 that drive optical shutter elements 302. All of the optical shutter elements 302 and the drive ICs 303 are provided on substrate 301. Optical shutter array module 30 and drive IC control unit 31 are connected by means of signal line 32 that transmits signals to drive the optical shutter elements. Common electrode 16 of optical shutter elements 302 of the optical shutter array module 30 and the heat distributing resistor 18 are connected. In addition, the heat distributing resistor 18 and the drive IC control unit 31 are connected via ground 17.

In this circuit, heat generation by the drive ICs 303 is prevented by concentrating heat generation in the heat distributing resistor 18. By mounting this heat distributing resistor 18 outside the print head and and cooling only the heat distributing resistor 18, for example, by means of cooling air flown in the direction of arrow D3, an increase in the temperature of the entire print head is prevented. As a variance, the heat distributing resistor 18 may be mounted the integrated circuit board on which the IC control unit 31 is mounted.

Table 1 below shows the results of an increase in the temperature of optical shutter array module 30 when heat distributing resistors 18 having different resistance levels were used in the PLZT optical shutter array drive circuit shown in FIG. 7. The drive frequency was set at 100 kHz in the experiment. Here, when the resistance level of the heat distributing resistor 18 is 0 Ω, it means that it is equivalent to the conventional example where no heat distributing resistor 18 is employed.

TABLE 1

| | Resistance level of heat distributing resistor (Ω) | Temperature increase of module (° C.) |
| --- | --- | --- |
| Comparison sample | 0 | 50 |
| Experiment sample 1 | 5 | 37 |
| Experiment sample 2 | 10 | 35 |
| Experiment sample 3 | 20 | 32 |

Referring to Table 1, it is clear that the optical shutter array module 30 can be driven while keeping the temperature of the optical shutter array module 30 at a temperature close to room temperature (25° C.) by setting the resistance level of the heat distributing resistor 18 at 20 Ω.

Thus, as a result of the present invention, during the charging and the discharging of the optical shutter elements 302 of the optical shutter array module 30, heat distributing resistor 18 to which a current that charges or discharges optical shutter elements 302 flows is mounted between common electrode 16 of optical shutter elements 302 and ground 17 of the power supply line of drive power source 1 in drive IC control unit 31, such that the resistor will consume power. Further, by mounting the heat distributing resistor 18 outside the optical shutter array module 30 and cooling only the heat distributing resistor 18, heat generation by drive ICs 303 that drive optical shutter elements 302 can be prevented using a simple circuit.

As stated, the apparatus of the present invention provides important advantages over the prior art. Most importantly, the use of the present invention reduces the power dissipated by the switching elements of the optical shutter array, thereby preventing a temperature increase of the switching elements as a result of operating the switching elements.

In addition, the present invention prevents the temperature increase of the switching elements via a simple circuit, which is both cost effective and easy to implement.

Variations of the foregoing embodiment of the present invention are also possible. For example, while the foregoing description of the optical shutter element drive mechanism pertains to driving an optical shutter comprising a PLZT element, the present invention can also be utilized to drive non-PLZT optical shutters, such as a liquid crystal light shutter element. Such liquid crystal light shutter elements include, for example, ferroelectric liquid crystal light shutter elements.

In another variation, the driving mechanism can also be utilized to drive an image forming apparatus which forms an image on a display panel. Example of such image forming apparatus include a head mount display which forms an image on a human eye, an over head projector which forms an image on a screen, etc.

In yet another variation, the present invention can also be utilized as a driving apparatus for driving a PZT material employed in an ink jet printer. The PZT material is utilized to form elements which correspond to ink cavities. By applying electrical voltage to specific PZT elements, the PZT elements are vibrated, and ink drops are ejected from the respective elements of the ink cavities to a recording sheet.

In each of the foregoing examples, the basic operation of the driving mechanism of the present invention remains substantially the same. Of course, additional variations are also possible.

Although the elements of the present invention have been described in conjunction with an exemplary embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

We claim:

1. A driving circuit for driving an element which is electrically equivalent to a condenser by charging and discharging said element, said driving circuit comprising:
   a driver disposed on an integrated circuit board; and
   a resistor located externally of said integrated circuit board through which a charging current and a discharging current flow, said charging current occurring when said element is charged, said discharging current occurring when said element is discharged.

2. The driving circuit according to claim 1, further comprising:
   a switching unit for controlling the charging and discharging of said element.

3. The driving circuit according to claim 2,
   wherein said switching unit is disposed on an integrated circuit board.

4. The driving circuit according to claim 2, wherein said switching unit comprises:
   a first switch and second switch operating in combination with one another to forming a charging circuit and a discharging circuit.

5. The driving circuit according to claim 4,
   wherein said charging circuit is formed when said first switch is in an ON state and said second switch is in an OFF state, and said discharging circuit is formed when said first switch is in an OFF state and said second switch is in an ON state.

6. The driving circuit according to claim 1,
   wherein said element is a light shutter element.

7. The driving circuit according to claim 6,
   wherein said light shutter element comprises a PLZT material.

8. The driving circuit according to claim 6,
   wherein said light shutter element comprises a ferroelectric liquid crystal.

9. The driving circuit according to claim 1,
   wherein said element comprises a PZT material.

10. An driving circuit for driving an array of elements by charging and discharging said elements, each of said elements being electrically equivalent to a condenser, said driving circuit comprising:
    a plurality of circuits electrically connected to said elements to control charging and discharging of said elements, each of said plurality of said circuits operative for generating a charging current for charging at least one of said elements, and for generating a discharging current for discharging at least one of said elements; and
    a resistor being electrically coupled to said elements and to said plurality of circuits, said charging current and said discharging current flowing through said resistor.

11. The driving circuit according to claim 10,
    wherein said plurality of circuits are disposed on an integrated circuit board, and said resistor is not disposed on said integrated circuit board.

12. The driving circuit according to claim 10,
    wherein each of said plurality of circuits comprises a first switch and a second switch for selectively forming either a charging circuit or a discharging circuit.

13. The driving circuit according to claim 12,
    wherein said charging circuit is formed when said first switch is in an ON state and said second switch is in an OFF state, and said discharging circuit is formed when said first switch is in an OFF state and said second switch is in an ON state.

14. The driving circuit according to claim 10,
    wherein each of said elements is a light shutter element.

15. The driving circuit according to claim 14,
    wherein each of said light shutter elements comprises a PLZT material.

16. The driving circuit according to claim 14,
    wherein each of said light shutter elements comprises a ferroelectric liquid crystal.

17. The driving circuit according to claim 10,
    wherein each of said elements comprises a PZT material.

18. A driving circuit for driving an optical shutter element which is electrically equivalent to a condenser by charging and discharging said optical shutter element, said driving circuit comprising:
    an integrated circuit driver; and
    a resistor through which a charging current and a discharging current flow, the charging current occurring when said optical shutter element is charged, the discharging occurring when said optical shutter element is discharged.

19. An optical shutter element drive mechanism for driving optical shutter elements that are electrically equivalent to condensers by charging and discharging said elements by a power source and switching elements, said optical shutter element drive mechanism comprising:
    a resistor through which a current for charging said optical shutter elements flows when said optical shutter elements are charged and through which a current for discharging said optical shutter elements flows when said optical shutter elements are discharged.

* * * * *